US005756200A

United States Patent [19]

Ebisch et al.

[11] Patent Number: 5,756,200

[45] Date of Patent: May 26, 1998

[54] PHOTOGRAPHIC SUPPORT MATERIAL WITH A BACKLAYER CONTAINING COARSE SILICA PARTICLES OF SPECIFIC PORE VOLUME

[75] Inventors: Rolf Ebisch, Osnabrück; Hans-Ulrich Berner, Hilter; Hans-Udo Tyrakowski, Hasbergen, all of Germany

[73] Assignee: Felix Schoeller jr. Foto- und Spezialpapiere GmbH & Co. KG, Osnabruck, Germany

[21] Appl. No.: 841,471

[22] Filed: Apr. 22, 1997

Related U.S. Application Data

[63] Continuation of Ser. No. 514,243, Aug. 11, 1995, abandoned.

[30] Foreign Application Priority Data

Aug. 16, 1994 [DE] Germany .......................... 44 28 941.3

[51] Int. Cl.[6] .............................. B32B 5/16; G03C 1/85

[52] U.S. Cl. ......................... 428/331; 428/339; 428/341; 428/342; 428/355 AC; 428/404; 428/451; 428/452; 430/523; 430/529

[58] Field of Search .................................... 428/331, 403, 428/404, 339, 340, 341, 342, 355 AC, 451, 452; 430/523, 527, 529

[56] References Cited

U.S. PATENT DOCUMENTS

| | | | |
|---|---|---|---|
| 5,064,717 | 11/1991 | Suzuki et al. | 428/352 |
| 5,104,779 | 4/1992 | Saverin et al. | 430/527 |
| 5,232,824 | 8/1993 | Saverin et al. | 430/529 |
| 5,466,536 | 11/1995 | Berner et al. | 428/522 |

FOREIGN PATENT DOCUMENTS 3735871 5/1989 Germany .

OTHER PUBLICATIONS

English translation of Japanese Patent Publication 63 004, 231 patented on Jan. 1988.

*Primary Examiner*—H. Thi Le
*Attorney, Agent, or Firm*—Lockwood, Alex, FitzGibbon & Cummings

[57] ABSTRACT

The invention relates to a photographic support material with a backlayer and to a coating composition for producing this backlayer. The layer is distinguished by excellent writing properties with pencils and is free of contaminations by aged developing baths. It is composed of carboxylated acrylate copolymer, organic polyacid, coarse-grained silica, thickener and, preferably, colloidal aluminium-modified silica.

15 Claims, No Drawings

PHOTOGRAPHIC SUPPORT MATERIAL WITH A BACKLAYER CONTAINING COARSE SILICA PARTICLES OF SPECIFIC PORE VOLUME

This application is a continuation of application Ser. No. 514,243, filed Aug. 11, 1995, now abandoned.

FIELD OF THE INVENTION

The invention relates to a support material for photographic layers in the form of a plastic-coated paper or plastic film with a backlayer on the paper or film, and to an aqueous coating composition for producing this backlayer.

BACKGROUND OF THE INVENTION

Backlayers are those layers which are located on the opposite side of the support material to the photographic emulsion which is to be applied later. The backlayers of such support materials are intended to confer the following properties upon the plastic surfaces:

- Antistatic character, so that no flashes, no sorting problems and no intensified attractions of dirt occur during further processing.
- Writing and printing properties, so that the materials can be marked.
- Low dirt absorption as regards tarry oxidation products of photographic developing baths.
- Tape adhesion, so that the roll materials can be fixed to one another in the developing process.

Some customers demand backlayers with an optimization of all the said properties, and other customers prefer backlayers which have particularly good individual properties. This is demonstrated by the two Patent Specifications JP-63 004,231 and DE-PS 3,735,871.

In JP-63 004,231, a backlayer is described which displays an antistatic character, imprintability and low dirt absorption. It is produced by means of a coating composition of polymer latex (for example an acrylate copolymer containing carboxyl groups), conductivity agent (for example polystyrenesulphonic acid) and colloidal silica. The coating composition can additionally contain auxiliaries (for example hydroxyethylcellulose).

The backlayer thus obtained, however, can not be written on with pencils.

DE-PS 3,735,871 describes a backlayer in which all the properties have been optimized, that is to say it is possible also to write on this layer with pencils. The coating composition for this backlayer is composed of a terpolymer of predominantly styrene and butadiene, a conductivity agent (for example polystyrenesulphonic acid), a colloidal silica and a silica having a mean particle size of from 3 to 6 μm. Coupled with very good antistatic properties, the possibility of writing with pencils is almost good to good, and the dirt absorption is still low to very low. However, both of these properties are still capable of improvement.

SUMMARY AND DESCRIPTION OF THE INVENTION

It is therefore an object of this invention to provide a support material for photographic layers which, with adequately good overall properties, allows very easy writing with pencils on the back and does not show any dirt absorption due to photographic developer solutions.

A further object of this invention is to provide a coating composition, by means of which the desired backlayer as described above can be obtained on the back of plastic-coated papers or plastic films.

These objects are achieved by a coating composition or by a backlayer comprising at least,

- an acrylate copolymer containing carboxyl groups, which more than 80% by weight is repeating units of one or more of the monomers acrylate, $C_1$ to $C_6$-alkylacrylate and styrene, the free carboxyl groups of the acrylate copolymer preferably remaining uncrosslinked,
- an organic polyacid conductivity agent with carboxylic or sulphonic acid groups which are free or bound as a salt,
- a coarse-grained silica of 3 to 6 μm particle size, <1 ml/g pore volume and>400 $m^2/g$ (according to BET) surface area and
- a readily salt-compatible thickener.

In some preferred embodiments of the invention, the coating composition or the backlayer additionally contains a colloidal aluminium-modified silica. The acrylate copolymer/conductivity agent ratio is preferably 90:10 to 70:30.

The acrylate copolymer/coarse-grained silica ratio is preferably 90:10 to 40:60.

The ratio of acrylate copolymer to the (optional) colloidal silica preferably ranges from 100:0 to 30:70.

The free carboxyl groups in the acrylate copolymer are produced by copolymerization of unsaturated carboxylic acids, for example of acrylic acid, methacrylic acid or maleic acid. These free carboxyl groups contribute, in addition to the conductivity agents, to the antistatic finishing of the backlayer. They are therefore not blocked even by reaction with crosslinking agents.

Binders (copolymers) which form soft plastic films have a detrimental effect on the ability to be written on with pencils. For this reason, a copolymer is used whose monomers form hard films. The copolymer according to the invention is composed to the extent of more than 80 by weight of one or more of the monomers acrylate, $C_1$ to $C_6$-alkylacrylate and styrene.

Hard homopolymers of the abovementioned monomers, such as, for example, polystyrene or polymethylmethacrylate, have indentation hardnesses of 120–200 $N/mm^2$, measured according to DIN 53456, while soft homopolymers such as, for example, polyolefins show indentation hardnesses of 10–100 $N/mm^2$.

The organic polyacid employed as the conductivity agent, or the salt of this acid, is preferably the alkali metal salt of the acid, which can be a carboxylic acid such as polyacrylic acid or a sulphonic acid such as polystyrenesulphonic acid or naphthalenesulphonic acid.

An addition of coarse-grained silica generally has a positive effect on the ability to write thereon with pencils. Surprisingly, however, it has been found that a statement of the particle size of this silica is not an unambiguous yardstick for this positive effect. The pore volume and especially the surface area have a substantial influence (compare Example B1 with the comparison Example V1). According to the invention, the coarse-grained silica has a particle size of from 3 to 6 μm, a pore volume of <1 ml/g and a surface area of >400 $m^2/g$. In a particularly preferred embodiment, the silica has a surface area of from 600 to 800 $m^2/g$.

Examples of readily salt-compatible thickeners are hydroxyethylcellulose or water-soluble acrylate-based copolymers containing carboxyl groups. Other thickeners, which are not readily salt-compatible, such as carboxymethyl celluloses, cause flocculations in the coating composition.

All the components are mixed together with water to give a coating composition, and it is possible also to add to the mixture as a whole small, non-interfering quantities, that is to say <5% by weight, of wetting agents, dispersants, water-soluble binders or dyes.

The coating composition can be applied by means of all conventional application means to the back of the support material to be coated, and then dried, the applied quantity being selected such that, after drying, an applied weight of from 0.2 to 2.0 $g/m^2$ is present.

The aqueous coating composition can vary within the following quantities by weight:

| | wt. % |
|---|---|
| Acrylate copolymer as a 50% aqueous dispersion | 3.0–10.0 |
| Conductivity agent as a 30% aqueous solution | 1.5–4.0 |
| Coarse-grained silica | 0.5–4.0 |
| Colloidal silica as a 30% wt. aqueous sol | 0.0–20.0 |
| Thickener as a 2% wt. solution | 25.0–40.0 |
| Water | To make up to 100.0 |

The following examples are intended to illustrate the invention:

A base paper of 175 $g/m^2$ weight per unit area, which had been coated on the front with 30 $g/m^2$ polyethylene ethylene containing 10% by weight of titanium dioxide, and had been coated on the back with 30 $g/m^2$ polyethylene, was first subjected to a corona discharge on the back and the latter was then coated with the coating compositions listed in Table 1. For metering the weight applied, a no. 10 metering bar (=0.1 mm diameter of the wound wire) was used. The applied layers were dried in a hot-air duct to give the applied weights listed in Table 1.

TABLE 1

| Constituents of the coating composition in % by weight | Examples B1 | B2 | B3 | B4 |
|---|---|---|---|---|
| Water | 53.5 | 39.5 | 61.5 | 37.0 |
| Dispersion of copolymer containing carboxyl groups, 1:1 $C_1$ to $C_6$-alkyl- acrylate/styrene, 49% by weight (Carboset GA 1086 from B. F. Goodrich) | 6.0 | 9.0 | 3.0 | 5.0 |
| Sodium polystyrenesulphonate, 30% by weight | 2.5 | 2.0 | 3.5 | 3.0 |
| Coarse-grained silica, particle size 4.9 μm, pore volume 0.4 ml/g, surface area 750 $m^2/g$ (Gasil 200 DF from Crosfield Chem.) | 2.0 | 4.0 | 3.0 | 1.0 |
| Colloidal aluminium-modified silica 30% by weight (Ludox AM from Du Pont) | 5.0 | 4.5 | — | 18.0 |
| Hydroxyethylcellulose, 2% by weight in water (Tylose H 300 from Hoechst) | 30.0 | 40.0 | 28.0 | 35.0 |
| Wetting agent, 10% by weight in methanol (Surfynol 440 from Air Reduct. Chem.) | 1.0 | 1.0 | 1.0 | 1.0 |
| Applied weight in $g/m^2$, after drying | 0.6 | 1.7 | 0.3 | 0.8 |

TABLE 1-continued

COMPARISON EXAMPLES

For comparison, variants of the coating composition B1 were applied under the same conditions as in the Examples.

TABLE 2

| Constituents of the coating composition in % by weight | Comparison Examples V1 | V2 | V3 |
|---|---|---|---|
| Water | 53.5 | 83.5 | 53.2 |
| Acrylate copolymer from Example B1 | 6.0 | 6.0 | 6.0 |
| Sodium styrenesulphonate from Example B1 | 2.5 | 2.5 | 2.5 |
| Coarse-grained silica from Example B1 | — | 2.0 | 2.0 |
| Colloidal silica from Example B1 | 5.0 | 5.0 | 5.0 |
| Hydroxyethylcellulose from Example B1 | 30.0 | — | 30.0 |
| Wetting agent from Example B1 | 1.0 | 1.0 | 1.0 |
| Coarse-grained silica, particle size 4.1 μm, pore volume 1.2 ml/g, surface area 320 $m^2/g$ (Gasil 644 M from Crosfield) | 2.0 | — | — |
| Trifunctional aziridine, 50% by weight in isopropanol, as crosslinking agent (Xama 7 from Celanese) | — | — | 0.3 |
| Applied weight in $g/m^2$ after drying | 0.6 | 0.3 | 0.6 |

The support materials produced with the coating compositions of the examples and comparison examples were subjected to the following tests:

The test for the antistatic properties was carried out by measuring the surface resistivity using a comb electrode according to DIN-VDE 303T3.

The test for imprintability was carried out using the commercially available ink ribbons "new cherry ribbon" and "Kodak back printer CAT 1402114". The specimens were imprinted on a typewriter by typing/via the ink ribbons and then put for the duration of 3.5 minutes into the Kodak developer EP2 at 38° C. The specimens laid flat were then wiped 5 times with a velvet-covered and water-soaked roll of 180 g weight at a drawing speed of 10 cm/second. The wiping resistance of the lettering image was assessed visually.

The ability to be written on with pencils was carried out with pencil hardness HB and assessed visually.

For testing the dirt absorption, 250 ml of the commercially available colour developer CP-1R18P were stirred at 40° C. in a beaker for 12 hours at 500 rpm. This formed a dark tarry layer of oxidation products on the surface. The developer was then poured onto ABS plates (acrylonitrile/butadiene/styrene copolymer), on which the tarry layer deposited. The specimens were laid by their backs on the plates and covered with paper, and a roll of 2 kg weight was rolled 3 times over them. The specimens were then rinsed for 1 minute with running water and suspended for drying. The dirt which still adhered was visually assessed as dirt absorption.

For testing the tape adhesion, the commercially available, 5 cm wide 3M adhesive tape no. 8422 was pressed onto the backlayer and forced down by means of a roll of 8 kg weight. Using punched-out, 15 mm wide strips of this composite, the adhesive tape was peeled off from the specimen in a breaking-load tester under an angle of 1800° at a speed of 20 cm/minute and with continuous wetting of the separation point with water. The force required for peeling off was measured. A value of >2.0 N/15 mm means good adhesion, and the value of >1.0 N/15 mm means adequate adhesion.

The test results are summarized in Table 3 which follows and in the subsequent paragraph.

TABLE 3

| | Examples | | | | Comparison Examples | | |
|---|---|---|---|---|---|---|---|
| | B1 | B2 | B3 | B4 | V1 | V2 | V3 |
| Surface resistivity Ω/cm | | | | | | | |
| Before running through the baths | $9 \times 10^9$ | $4 \times 10^{10}$ | $5 \times 10^9$ | $8 \times 10^9$ | $8 \times 10^9$ | $9 \times 10^9$ | $3 \times 10^{10}$ |
| After running through the baths | $7 \times 10^{12}$ | $9 \times 10^{12}$ | $1 \times 10^{13}$ | $9 \times 10^{11}$ | $7 \times 10^{12}$ | $6 \times 10^{12}$ | $8 \times 10^{12}$ |
| Imprintability | good | good | good | good | good | good | good |
| Ability to be written on with a pencil | very good | very good | very good | very good | poor | very good | very good |
| Dirt absorption | none | none | none | none | very low | very low | low |
| Tape adhesion N/15 mm | 1.7 | 1.5 | 2.1 | 1.6 | 1.5 | 2.3 | 2.8 |

The coating composition of Comparison Example V2 (without hydroxyethylcellulose) only showed low stability. Already after 1–2 hours, marked sedimentation of the coarse-grained silica occurred, while the other coating compositions (with hydroxyethylcellulose) were still stable after 24 hours, and that is to say showed no significant sedimentation.

The examples show that it was possible, coupled with good general properties, to improve the dirt absorption and the ability to be written on with pencils up to outstanding values. The stability of the coating compositions according to the invention ensures processing without any problems.

It will be understood that changes in the details, materials, and operating conditions which have been herein described and illustrated in these Examples in order to explain the nature of the invention may be made by those skilled in the art within the principles and scope of the present invention.

We claim:

1. A photographic support material of plastic coated paper or a plastic film and having a backlayer, the backlayer comprising:
   - an acrylate copolymer containing carboxyl groups, of which more than 80% by weight is repeating units of one or more of the monomers acrylate, $C_1$ to $C_6$-alkylacrylate and styrene;
   - an organic polyacid with carboxylic or sulphonic acid groups or salts thereof;
   - a readily salt-compatible thickener; and
   - a coarse grained silica of 3 to 6 µm particle size, a pore volume of less than 1 ml/g and a surface area of greater than 400 $m^2$/g.

2. The support material of claim 1, wherein the acrylate copolymer/organic polyacid weight ratio is 90:10 to 70:30.

3. The support material of claim 1, wherein the acrylate copolymer/coarse grained silica weight ratio is 90:10 to 40:60.

4. The support material of claim 1, wherein the backlayer also includes a colloidal aluminum-modified silica.

5. The support material of claim 1, and having an acrylate copolymer/colloidal aluminum-modified silica weight ratio of 100:0 to 30:70.

6. The support material of claim 1, wherein the acrylate copolymer includes free carboxyl groups which remain uncrosslinked.

7. The support material of claim 1, wherein the organic polyacid is a free acid or the alkali metal salt of a free acid of polyacrylic acid, polystyrenesulphonic acid or naphthalenesulphonic acid.

8. The support material of claim 1, wherein the readily salt-compatible thickener is hydroxyethylcellulose or a water soluble acrylate-based copolymer containing carboxyl groups.

9. The support material of claim 1, wherein the backlayer has a weight per unit area of from 0.2 to 2.0 g/$m^2$.

10. A coating composition wherein the components of which comprise:
   - an acrylate copolymer containing carboxyl groups, of which more than 80% by weight is repeating units of one or more of the monomers acrylate, $C_1$ to $C_6$-alkylacrylate and styrene;
   - an organic polyacid with carboxylic or sulphonic acid groups or salts thereof;
   - a readily salt-compatible thickener; and
   - a coarse grained silica of 3 to 6 µm particle size, a pore volume of less than 1 ml/g and a surface area of greater than 400 $m^2$/g.

11. The coating composition of claim 10, also including a colloidal aluminum-modified silica.

12. The coating composition of claim 10, wherein the organic polyacid is a free acid or the alkali metal salt of a free acid of polyacrylic acid, polystyrenesulphonic acid or naphthalenesulphonic acid.

13. The coating composition of claim 10, wherein the readily salt-compatible thickener is hydroxyethylcellulose or a water-soluble acrylate-based copolymer containing carboxyl groups.

14. The coating composition of claim 10, wherein the acrylate copolymer, when present in the form of about 50 wt % of aqueous dispersion, is present in an amount of about 3.0–10.0 wt % of the composition;

the organic polyacid, when present in the form of about 30 wt % aqueous solution, is present in the amount of about 1.5–4.0 wt % of the composition;

the thickener, when present in the form of about 2 wt % aqueous solution, is present in an amount of about 25.0–40.0 wt % of the composition;

the coarse grained-silica is present in an amount of about 0.5–4.0 wt % of the composition;

a colloidal silica, when present in the form of about 30 wt % aqueous sol, is present in an amount of about 0.0–20.0 wt % of the composition; and the remainder of the composition is water.

15. The support material of claim 10, wherein the acrylate copolymer includes free carboxyl groups which remain uncrosslinked.

* * * * *

UNITED STATES PATENT AND TRADEMARK OFFICE

CERTIFICATE OF CORRECTION

PATENT NO. : 5,756,200

DATED : May 26, 1998

INVENTOR(S) : Rolf Ebisch, Hans-Ulrich Berner and Hans-Udo Tyrakowski

It is certified that error appears in the above-indentified patent and that said Letters Patent is hereby corrected as shown below:

Col. 2, line 37, after "80" insert --%--; line 57, delete "comparison" and insert --Comparison--.
Col. 3, line 30, delete "ethylene".
Col. 5, line 11, delete "1800°" and insert --180°--.

Signed and Sealed this

Twentieth Day of October, 1998

Attest:

BRUCE LEHMAN

*Attesting Officer* *Commissioner of Patents and Trademarks*